United States Patent
Matsui et al.

(10) Patent No.: US 10,594,002 B2
(45) Date of Patent: Mar. 17, 2020

(54) CHARGE VOLTAGE CONTROLLER FOR ENERGY STORAGE DEVICE, ENERGY STORAGE APPARATUS, BATTERY CHARGER FOR ENERGY STORAGE DEVICE, AND CHARGING METHOD FOR ENERGY STORAGE DEVICE

(71) Applicant: GS Yuasa International Ltd., Kyoto-shi (JP)

(72) Inventors: Hiroki Matsui, Kyoto (JP); Yuta Kashiwa, Kyoto (JP); Seijiro Ochiai, Kyoto (JP); Takaaki Iguchi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 31 days.

(21) Appl. No.: 15/556,598

(22) PCT Filed: Mar. 30, 2016

(86) PCT No.: PCT/JP2016/060400
§ 371 (c)(1),
(2) Date: Sep. 7, 2017

(87) PCT Pub. No.: WO2016/159086
PCT Pub. Date: Oct. 6, 2016

(65) Prior Publication Data
US 2018/0053971 A1    Feb. 22, 2018

(30) Foreign Application Priority Data
Mar. 31, 2015   (JP) .................................. 2015-073742

(51) Int. Cl.
*H02J 7/00*   (2006.01)
*H01M 10/44*   (2006.01)
(Continued)

(52) U.S. Cl.
CPC ............. *H01M 10/44* (2013.01); *B60L 58/12* (2019.02); *H01M 4/13* (2013.01); *H02J 7/007* (2013.01);
(Continued)

(58) Field of Classification Search
CPC ............... H02J 7/0031; H02J 2007/004; H02J 2007/0037; Y02E 60/12; H01M 10/48
(Continued)

(56) References Cited

U.S. PATENT DOCUMENTS 5,572,110 A * 11/1996 Dunstan ................ H02J 7/0004
320/106
5,635,959 A *  6/1997 Takeuchi .............. G06F 1/1626
178/19.01
(Continued)

FOREIGN PATENT DOCUMENTS

JP    2001-052760 A    2/2001
JP    3611905 B2    1/2005
(Continued)

OTHER PUBLICATIONS

International Search Report (ISR) (PCT Form PCT/ISA/210), in PCT/JP2016/060400, dated Jun. 14, 2016.

*Primary Examiner* — Arun C Williams
(74) *Attorney, Agent, or Firm* — McGinn IP Law Group, PLLC

(57) ABSTRACT

An embodiment provides a charge voltage controller for a chargeable and dischargeable energy storage device including an electrode assembly having a positive electrode and a negative electrode, the charge voltage controller configured to control upper limit voltage applied to charge the energy storage device in accordance with at least one of charge time of the energy storage device, current inputted to the energy storage device, temperature of the energy storage device, (Continued)

and a state of charge of the energy storage device, to inhibit potential of the negative electrode from being lower than deposition potential at which metal ions transmitting and receiving an electric charge between the positive electrode and the negative electrode are deposited at the negative electrode.

18 Claims, 13 Drawing Sheets

(51) Int. Cl.
*B60L 58/12* (2019.01)
*H01M 4/13* (2010.01)
*H01M 10/052* (2010.01)

(52) U.S. Cl.
CPC ........ *H01M 10/052* (2013.01); *H01M 10/441* (2013.01); *H01M 10/443* (2013.01)

(58) Field of Classification Search
USPC .......................................... 320/134
See application file for complete search history.

(56) References Cited

U.S. PATENT DOCUMENTS

| | | | |
|---|---|---|---|
| 2003/0025479 A1* | 2/2003 | Kikuchi | G01R 31/3679 320/134 |
| 2010/0000809 A1* | 1/2010 | Nishi | B60K 6/445 180/65.29 |
| 2011/0084662 A1 | 4/2011 | Yang et al. | |
| 2011/0127958 A1* | 6/2011 | Ishishita | B60L 11/1862 320/109 |
| 2011/0187312 A1 | 8/2011 | Yamamoto et al. | |
| 2011/0199059 A1 | 8/2011 | Aradachi et al. | |
| 2012/0086368 A1 | 4/2012 | Kawabuchi et al. | |
| 2013/0082664 A1 | 4/2013 | Hiraoka et al. | |
| 2013/0221907 A1 | 8/2013 | Suzuki et al. | |
| 2014/0197797 A1* | 7/2014 | Yamazaki | H02J 7/0029 320/128 |

FOREIGN PATENT DOCUMENTS

| | | |
|---|---|---|
| JP | 2008-199860 A | 8/2008 |
| JP | 2008-252960 A | 10/2008 |
| JP | 2010-016976 A | 1/2010 |
| JP | 2011-158267 A | 8/2011 |
| JP | 2012-085452 A | 4/2012 |
| JP | 5119307 B2 | 1/2013 |
| JP | 2013-081332 A | 5/2013 |
| JP | 2013-115862 A | 6/2013 |
| JP | 2014-131386 A | 7/2014 |
| JP | 5622269 B2 | 11/2014 |
| WO | WO 2011/161865 A1 | 12/2011 |

\* cited by examiner

Fig. 5

| Charge time | SOC | Upper limit voltage value | | | |
|---|---|---|---|---|---|
| | | Temperature/°C | | | |
| | | 25°C | 0°C | -10°C | -30°C |
| 1sec | 55% | V₀ | V₀ | V₀ | V₀ |
| | 65% | V₀ | V₀ | V₀ | V₀ |
| | 75% | V₀ | V₀ | 0.99V₀ | 0.98V₀ |
| | 85% | V₀ | 0.98V₀ | 0.97V₀ | 0.95V₀ |
| 3sec | 55% | V₀ | V₀ | V₀ | V₀ |
| | 65% | V₀ | V₀ | V₀ | V₀ |
| | 75% | V₀ | V₀ | 0.99V₀ | 0.98V₀ |
| | 85% | 0.97V₀ | 0.97V₀ | 0.96V₀ | 0.95V₀ |
| 10sec | 55% | V₀ | V₀ | V₀ | V₀ |
| | 65% | V₀ | V₀ | V₀ | V₀ |
| | 75% | 0.98V₀ | 0.97V₀ | 0.97V₀ | 0.97V₀ |
| | 85% | 0.97V₀ | 0.97V₀ | 0.96V₀ | 0.95V₀ |

CHARGE VOLTAGE CONTROLLER FOR ENERGY STORAGE DEVICE, ENERGY STORAGE APPARATUS, BATTERY CHARGER FOR ENERGY STORAGE DEVICE, AND CHARGING METHOD FOR ENERGY STORAGE DEVICE

CROSS REFERENCE TO RELATED APPLICATION

The present application claims priority to Japanese Patent Application No. 2015-73742 which is incorporated by reference.

TECHNICAL FIELD

The present invention relates to a charge-discharge controller for a chargeable and dischargeable energy storage device, an energy storage apparatus, a battery charger configured to charge the energy storage device, and a method for charging the energy storage device.

BACKGROUND ART

There has conventionally been known a control device configured to control an upper limit of charge voltage (upper limit voltage) upon charge of a lithium ion battery (see Patent Document 1). The control device increases the upper limit voltage in accordance with capacity degradation of the lithium ion battery to be charged. The lithium ion battery can thus have substantially constant battery capacity available even if the lithium ion battery has capacity degradation.

Increase in upper limit voltage upon charge of the lithium ion battery may, however, lead to serious degradation in power and battery capacity of the lithium ion battery. Increase in upper limit voltage upon charge by the control device or the like along with degradation of the lithium ion battery may cause rapid degradation of the lithium ion battery.

PRIOR ART DOCUMENT

Patent Document

Patent Document 1: JP-A-2012-85452

SUMMARY OF THE INVENTION

Problems to be Solved by the Invention

The inventors of the present invention have researched improvement in performance of a lithium ion battery, which is mounted on a hybrid vehicle, to receive regenerative charged power. The inventors have focused on the fact that the lithium ion battery fails to sufficiently receive regenerative electric power if the upper limit voltage is set low upon charge, to inhibit degradation of the lithium ion battery. The inventors have found that this point is not fully considered and can be improved.

It is an object of the present embodiment to suppress degradation of an energy storage device as well as secure performance of the energy storage device to receive regenerative electric power by control of upper limit voltage upon charge.

Means for Solving the Problems

The present embodiment provides a charge voltage controller for a chargeable and dischargeable energy storage device including an electrode assembly having a positive electrode and a negative electrode, the charge voltage controller configured to control upper limit voltage applied to charge the energy storage device in accordance with at least one of charge time of the energy storage device, current inputted to the energy storage device, temperature of the energy storage device, and a state of charge of the energy storage device, to inhibit potential of the negative electrode from being lower than deposition potential at which metal ions transmitting and receiving an electric charge between the positive electrode and the negative electrode are deposited at the negative electrode.

BRIEF DESCRIPTION OF THE DRAWINGS

FIG. 5 is a chart exemplifying a table stored in a storage unit.

MODE FOR CARRYING OUT THE INVENTION

Figure 1:
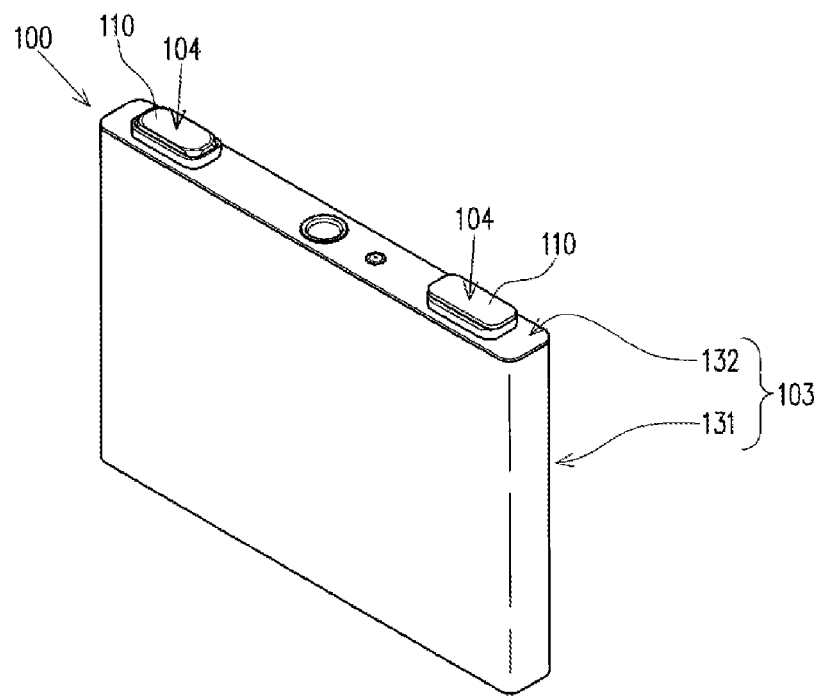
FIG. 1 is a perspective view of an energy storage device to be charged by a battery charger according to the present embodiment.
Figure 1:
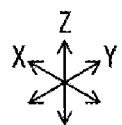

The present embodiment provides a charge voltage controller for a chargeable and dischargeable energy storage device including an electrode assembly having a positive electrode and a negative electrode, the charge voltage controller configured to control upper limit voltage applied to charge the energy storage device in accordance with at least one of charge time of the energy storage device, current inputted to the energy storage device, temperature of the energy storage device, and a state of charge of the energy storage device, to inhibit potential of the negative electrode from being lower than deposition potential at which metal ions transmitting and receiving an electric charge between the positive electrode and the negative electrode are deposited at the negative electrode.

When the potential of the negative electrode of the electrode assembly is lower than the deposition potential upon charge of the energy storage device, the negative electrode has metal deposition and the energy storage device degrades rapidly. The potential of the negative electrode of the electrode assembly and the deposition potential vary in accordance with a state of charge of the energy storage device, charge time of the energy storage device, current inputted to the energy storage device, temperature of the energy storage device, and the like. The negative electrode is likely to have metal deposition under a use condition where large current flows into the energy storage device. The negative electrode is likely to have metal deposition at low temperature (at 25° C. or less, particularly at 0° C. or less). The negative electrode is likely to have metal deposition in a state where the energy storage device is highly charged (at an SOC of 50% or more).

The charge voltage controller configured as described above suppresses degradation of the energy storage device as well as improves performance of the energy storage device to receive regenerative electric power.

The present embodiment provides an energy storage apparatus including the charge voltage controller and the energy storage device.

The present embodiment provides a battery charger for an energy storage device including a charge unit configured to charge a chargeable and dischargeable energy storage device including an electrode assembly having a positive electrode and a negative electrode, and the charge unit controls upper limit voltage upon charge of the energy storage device to inhibit potential of the negative electrode from being lower than deposition potential at which metal ions transmitting and receiving an electric charge between the positive electrode and the negative electrode are deposited at the negative electrode.

In this configuration, the upper limit voltage is controlled to inhibit the potential of the negative electrode from being lower than the deposition potential. This configuration suppresses deposition of metal ions at the negative electrode as well as increases the upper limit voltage (raises approximately to an upper limit value of a charge voltage range not causing the deposition). This achieves suppressing degradation of the energy storage device as well as securing the performance of the energy storage device to receive regenerative electric power.

Optionally, the battery charger for the energy storage device includes at least one of a first measuring section configured to measure charge time of the energy storage device, a second measuring section configured to measure temperature of the energy storage device, a third measuring section configured to measure current inputted to the energy storage device, and a fourth measuring section configured to measure voltage of the energy storage device, in which the charge unit controls the charge unit to control the upper limit voltage in accordance with at least one of the charge time, the temperature, and the state of charge of the energy storage device based on the current or the voltage.

In this configuration, the upper limit voltage can be controlled by measuring at least one of the charge time, the temperature of the energy storage device, the current upon charge or discharge, and the voltage of the energy storage device, which are measured easily. This easily achieves suppressing degradation of the energy storage device as well as securing the performance of the energy storage device to receive regenerative electric power.

Optionally, the battery charger for the energy storage device includes a storage unit configured to store data associating at least one of the charge time, the temperature, and the state of charge, with an upper limit voltage value corresponding thereto and based on the deposition potential, in which the charge unit adjusts the upper limit voltage so as to have an upper limit voltage value included in the data of the storage unit and corresponding to a value measured by at least one of the first to fourth measuring sections.

In this configuration, the storage unit preliminarily stores the data associating at least one of the charge time, the temperature of the energy storage device, and the state of charge (SOC) with the upper limit voltage value corresponding thereto and based on the deposition potential. The upper limit voltage value inhibiting the potential of the negative electrode from being lower than the deposition potential can easily be obtained simply with reference to the data if at least one of the charge time, the temperature of the energy storage device, charge-discharge current, and the state of charge is available. This more easily achieves suppressing degradation of the energy storage device as well as securing the performance of the energy storage device to receive regenerative electric power.

Optionally, in the data, the upper limit voltage value decreases when the charge time extends, increases when the temperature rises, and decreases when the state of charge is higher.

The present embodiment also provides a method for charging a chargeable and dischargeable energy storage device including an electrode assembly having a positive electrode and a negative electrode, and the method includes charging the energy storage device while controlling upper limit voltage to inhibit potential of the negative electrode from being lower than deposition potential at which metal ions transmitting and receiving an electric charge between the positive electrode and the negative electrode are deposited at the negative electrode.

This configuration suppresses deposition of metal ions at the negative electrode as well as increases the upper limit voltage (raises approximately to an upper limit value of a charge voltage range not causing the deposition). This achieves suppressing degradation of the energy storage device as well as securing the performance of the energy storage device to receive regenerative electric power.

As described above, the present embodiment achieves suppressing degradation of an energy storage device as well as securing performance of the energy storage device to receive regenerative electric power by control of upper limit voltage upon charge.

An embodiment of the present invention will be described below with reference to FIGS. 1 to 6. Names of constituent members (constituent elements) according to the present embodiment are effective in the present embodiment, and can be different from names of constituent members (constituent elements) according to the background art.

A battery charger for an energy storage device according to the present embodiment (hereinafter, simply referred to as the "battery charger") can be mounted on a hybrid vehicle driven by an engine and a motor. Initially described below is the energy storage device to be charged by the battery charger.

Figure 2:
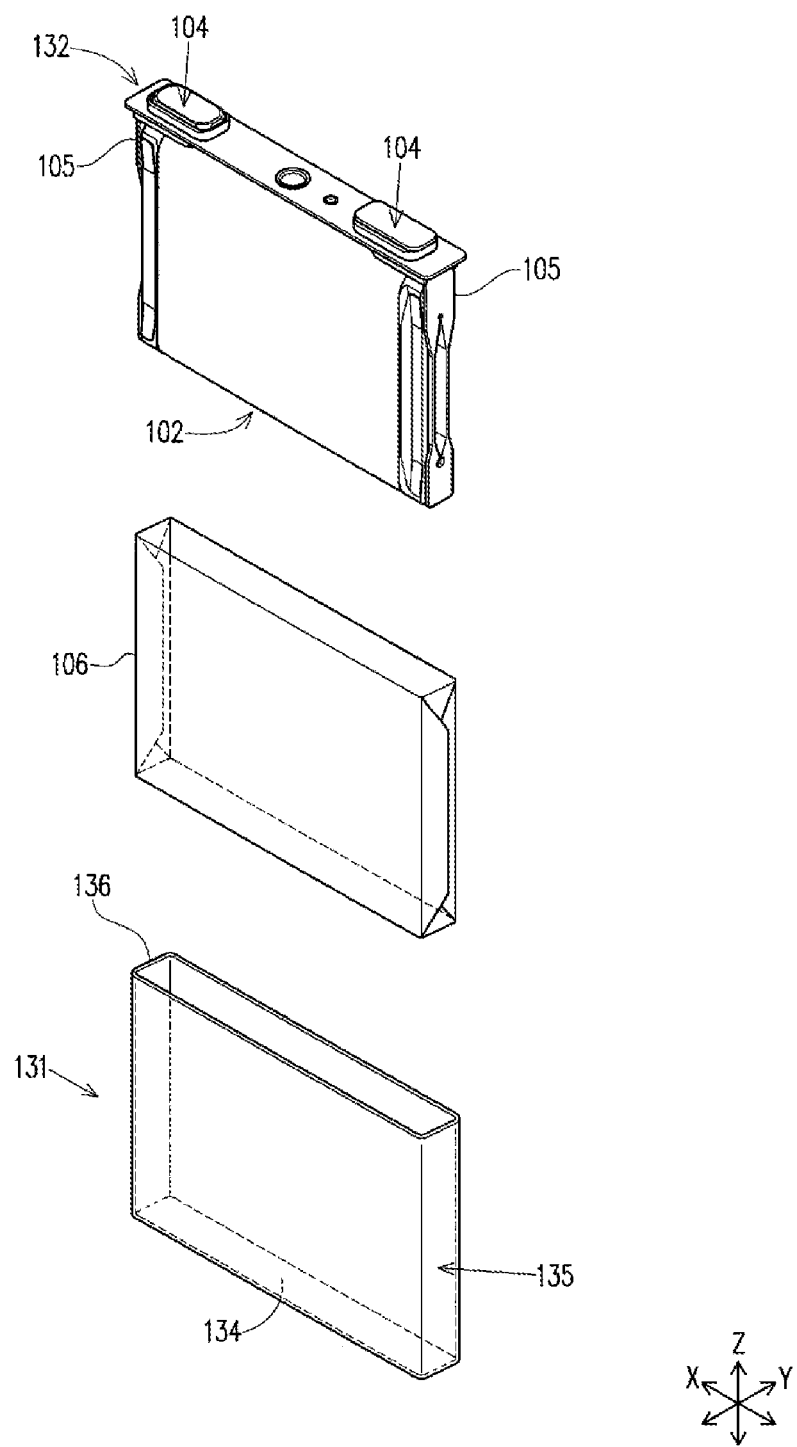
FIG. 2 is an exploded perspective view of the energy storage device.
Figure 3:
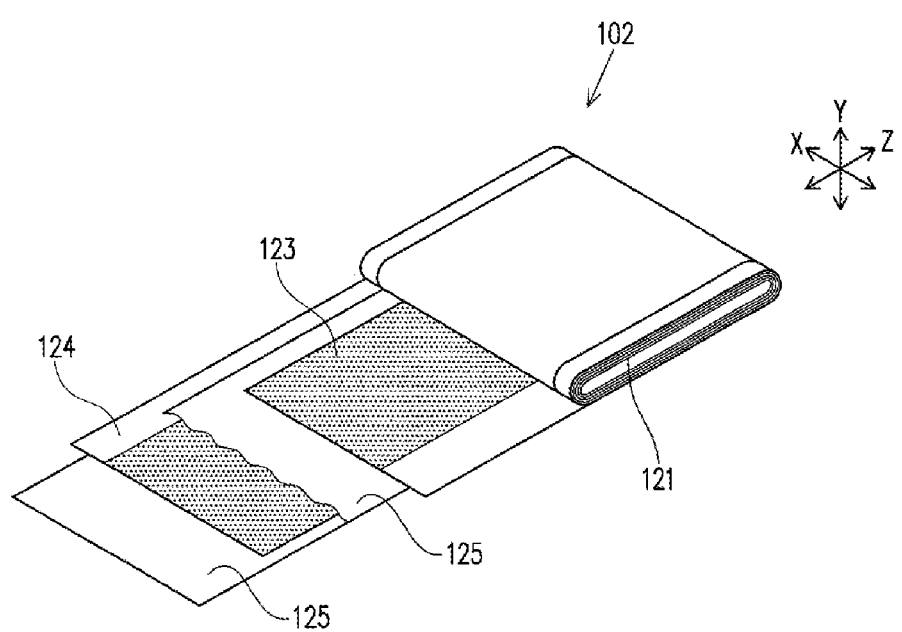
FIG. 3 is an explanatory view of an electrode assembly of the energy storage device.

The energy storage device according to the present embodiment is a nonaqueous electrolyte secondary battery, specifically, a lithium ion battery. The energy storage device is, however, not limited to the lithium ion battery. Examples of the energy storage device include a battery other than the lithium ion battery, which has temporary power decrease similarly to the lithium ion battery, and a capacitor. As depicted in FIGS. 1 to 3, an energy storage device 100 includes an electrode assembly 102 having a positive electrode 123 and a negative electrode 124, a case 103 accommodating the electrode assembly 102, and an external terminal 104 disposed outside the case 103. The energy storage device 100 further includes a current collector 105 configured to cause the electrode assembly 102 and the external terminal 104 to be conducted each other.

The electrode assembly 102 includes a winding core 121, and the positive electrode 123 and the negative electrode 124 insulated from each other and wound around the winding core 121. The energy storage device 100 is charged or discharges by migration of lithium ions between the positive electrode 123 and the negative electrode 124 in the electrode assembly 102.

The positive electrode 123 has metal foil and a positive active material layer provided on the metal foil. The metal foil has a belt shape. Examples of the metal foil according to the present embodiment include aluminum foil.

The positive active material according to the present embodiment is lithium metal oxide. The positive active material can alternatively be an active material of a two-phase reaction type. Specifically, the positive active material is expressed by a general formula of $LiMPO_4$, in which M can be any one of Fe, Mn, Cr, Co, Ni, V, Mo, and Mg.

Examples of the positive active material include a polyanion compound ($Li_aFe_bPO_4$, $Li_aMn_bPO_4$, $Li_aMn_bSiO_4$, $Li_aCo_bPO_4F$, or the like) expressed by $Li_aMe_b(XO_c)d$ (Me indicates one or at least two transition metals, and X indicates P, Si, B, V, or the like) including the active material of the two-phase reaction type. The examples of the positive active material further include composite oxide ($Li_xCoO_2$, $Li_xNiO_2$, $Li_xMnO_4$, $Li_xNi_yMn_zCo(1-y-z)O_2$, or the like) expressed by $Li_xMeO_p$ (Me indicates one or at least two transition metals).

The negative electrode 124 has metal foil and a negative active material layer provided on the metal foil. The metal foil has a belt shape. Examples of the metal foil according to the present embodiment include copper foil.

The negative active material according to the present embodiment is a carbonaceous material. Specifically, the negative active material can be any one of graphite, easily graphitizable carbon, hardly graphitizable carbon, and the like.

In the electrode assembly 102 according to the present embodiment, the positive electrode 123 and the negative electrode 124 configured as described above are wound while being insulated from each other by a separator 125. In other words, the positive electrode 123, the negative electrode 124, and the separator 125 are layered and wound in the electrode assembly 102 according to the present embodiment. The separator 125 is an insulating member. The separator 125 is disposed between the positive electrode 123 and the negative electrode 124. The positive electrode 123 and the negative electrode 124 are thus insulated from each other in the electrode assembly 102. The separator 125 holds electrolyte solution in the case 103. When the energy storage device 100 is charged or discharges, lithium ions migrate between the positive electrode 123 and the negative electrode 124 alternately layered with the separator 125 being interposed therebetween.

The separator 125 according to the present embodiment is of a high-power type adapted to the energy storage device having a large current flow, and has air resistance of 50 to 600 sec/cc. The energy storage device mounted on a hybrid vehicle is provided with the separator 125 having air resistance of 100 to 300 sec/100 cc.

Figure 8:
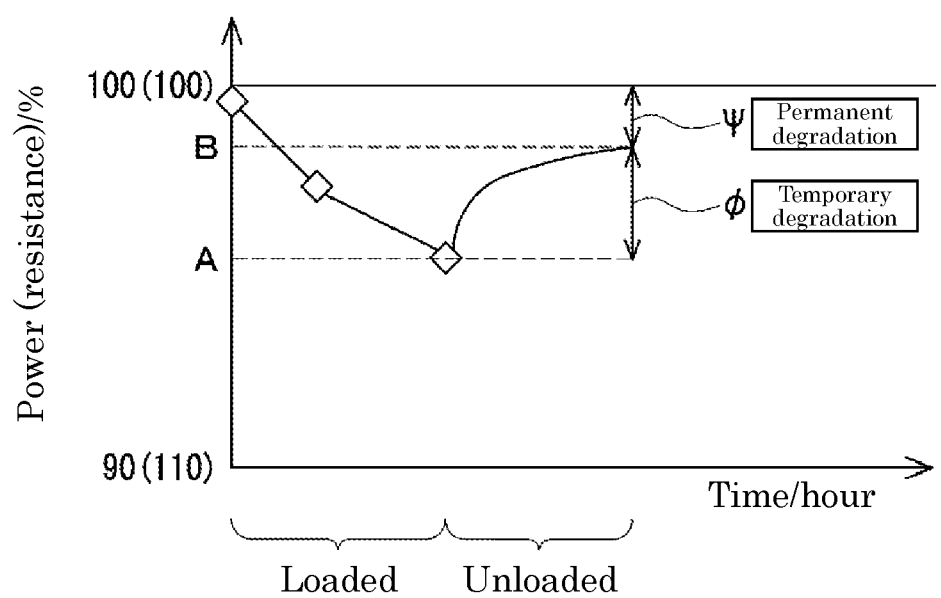
FIG. 8 is an explanatory graph of temporary power decrease.

Degradation (power decrease) of the energy storage device includes temporary power decrease and permanent power decrease. Serious temporary power decrease (a temporary power decrease rate) influences permanent power decrease that will not recover even under an unloaded condition of the energy storage device. Such a temporary power decrease rate relates to recoverable power decrease, and corresponds to, as indicated in FIG. 8, a difference (length of an arrow φ in FIG. 8) between a power decrease rate increased by application of a load to the energy storage device (a point A in FIG. 8) and a power decrease rate recovered from the state at the point A under the unloaded condition of the energy storage device for a predetermined period (a point B in FIG. 8). In other words, the temporary power decrease rate relates to a power decrease rate of the energy storage device recovered if the energy storage device is kept under the unloaded condition for a predetermined period while the energy storage device is in use with charge and discharge. In FIG. 8, a permanent power decrease rate at the point B corresponds to length of an arrow ψ.

A separator having less air resistance is likely to achieve higher power and less temporary power decrease.

The electrode assembly 102 is not limited to the wound type. The electrode assembly can alternatively be of a stacked type including a tabular positive electrode, a separator, and a tabular negative electrode being layered.

The case 103 includes a case body 131 having an opening, and a lid plate 132 blocking (closing) the opening of the case body 131. The case 103 is formed by joining an opening peripheral edge 136 of the case body 131 and a peripheral edge of the lid plate 132 overlapped each other. The case 103 has an internal space defined by the case body 131 and the lid plate 132. The case 103 accommodates, in the internal space, the electrode assembly 102, the current collector 105, and the like, as well as the electrolyte solution.

The case body 131 includes a blocking portion 134 having a rectangular plate shape, and a square tube trunk portion 135 connected to a peripheral edge of the blocking portion 134. The case body 131 thus has a square tube shape (i.e. a bottomed square tube shape) having a blocked end along the opening (in a Z axis direction).

The lid plate 132 is a plate member blocking the opening of the case body 131. Specifically, the lid plate 132 has an outline corresponding to the opening peripheral edge 136 of the case body 131. The lid plate 132 is thus a rectangular plate member. The peripheral edge of the lid plate 132 is overlapped with the opening peripheral edge 136 of the case body 131 such that the lid plate 132 blocks the opening of the case body 131. Hereinafter, assume that, as depicted in FIG. 1, the lid plate 132 has a long side extending along an X axis on rectangular coordinates, the lid plate 132 has a short side extending along a Y axis on the rectangular coordinates, and the lid plate 132 has a normal line extending along the Z axis on the rectangular coordinates.

The external terminal 104 is electrically connected with an external terminal of another energy storage device, external equipment, or the like. The external terminal 104 is provided as a conductive member. The external terminal 104 can be made of a highly weldable metal material such as an aluminum-based metal material like aluminum or aluminum alloy, or a copper-based metal material like copper or copper alloy.

The current collector 105 is disposed in the case 103 and is connected directly or indirectly to the electrode assembly 102 so as to be conductive with each other. The current collector 105 is provided as a conductive member and is disposed along an inner surface of the case 103.

The energy storage device 100 includes an insulating member 106 insulating the electrode assembly 102 from the case 103. The insulating member 106 according to the present embodiment has a bag shape. The insulating member 106 is disposed between the case 103 (specifically, the case body 131) and the electrode assembly 102. The insulating member 106 according to the present embodiment can be made of resin such as polypropylene or polyphenylene sulfide. In the energy storage device 100 according to the present embodiment, the case 103 accommodates the electrode assembly 102 (the electrode assembly 102 and the current collector 105) accommodated in the bag-shaped insulating member 106.

The battery charger configured to charge the energy storage device 100 will be described next with reference also to FIGS. 4 to 7.

Figure 4:
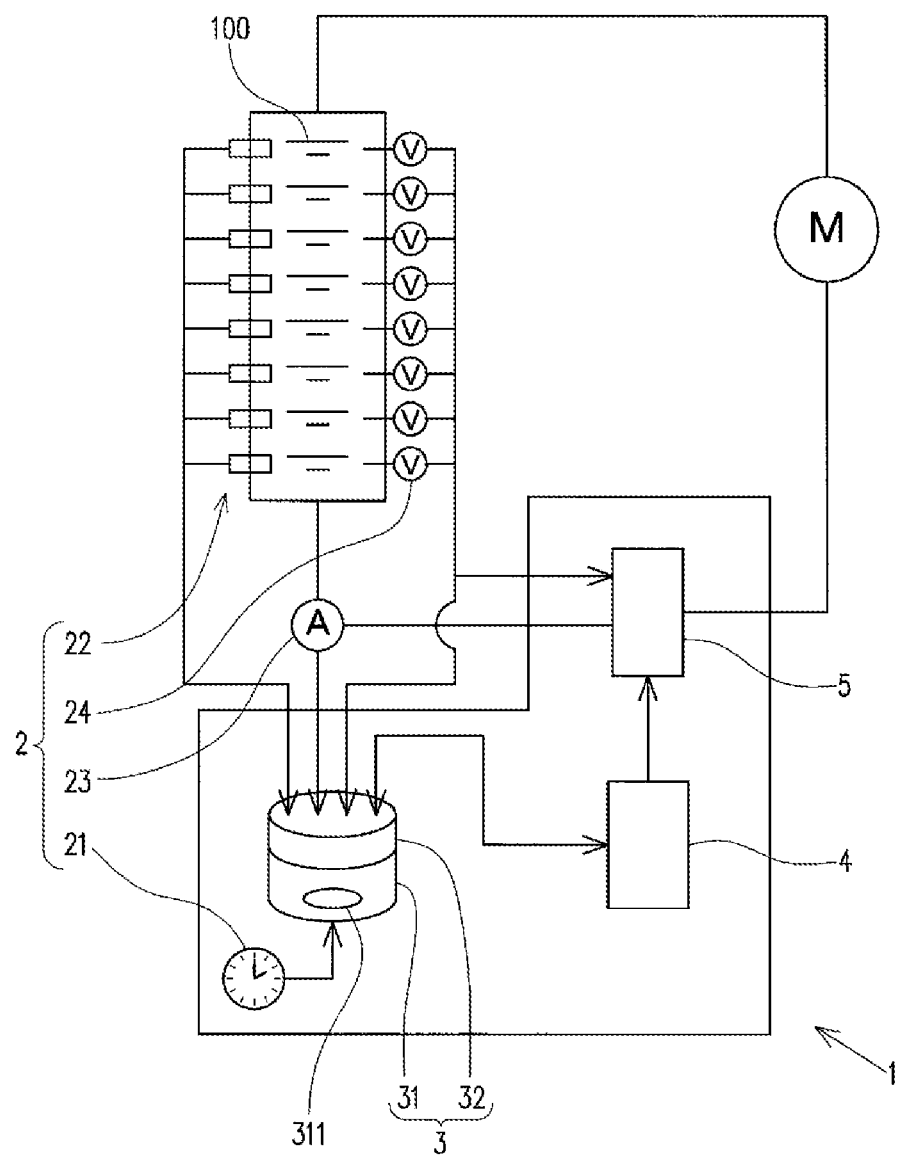
FIG. 4 is a schematic configuration diagram of the battery charger.

As depicted in FIG. 4, the battery charger includes a charge adjuster (charge unit) 5 configured to adjust charge current of the energy storage device 100. The charge adjuster 5 controls upper limit voltage (an upper limit of charge voltage) upon charge of the energy storage device 100, to inhibit potential of the negative electrode 124 from being lower than deposition potential at which metal ions (lithium ions in the present embodiment) transmitting and receiving an electric charge between the positive electrode 123 and the negative electrode 124 are deposited at the negative electrode 124.

Specifically, a battery charger 1 includes a measuring unit 2, an operation unit (charge voltage controller) 4 configured to operate upper limit voltage of the energy storage device 100 in accordance with a measurement result of the measuring unit 2, and the charge adjuster 5 configured to adjust charge current of the energy storage device 100 in accordance with an operation result of the operation unit 4. The battery charger 1 further includes a storage unit 3 storing data (information) such as a table on the upper limit voltage upon charge. The battery charger 1 according to the present embodiment is configured to charge a plurality of energy storage devices 100. In other words, the battery charger 1 can charge each of the energy storage devices 100 configuring an energy storage apparatus (included in the energy storage apparatus) such as a battery module.

The measuring unit 2 includes at least one of a first measuring section 21 configured to measure charge time of the energy storage device 100, a second measuring section 22 configured to measure temperature of the energy storage device 100, a third measuring section 23 configured to measure current (a current value) inputted to the energy storage device 100, and a fourth measuring section 24 configured to measure voltage (a voltage value) of the energy storage device 100. The measuring unit 2 according to the present embodiment includes the four measuring sections (the first to fourth measuring sections) 21 to 24.

Specifically, the first measuring section 21 measures time elapsed from charge start upon charge of the energy storage device 100 (elapsed charge time). The second measuring section 22 measures temperature of part (e.g. the lid plate 132, the blocking portion 134, or a long side surface or a short side surface of the trunk portion 135) of the case 103 of each of the energy storage devices 100. The third measuring section 23 measures current inputted to each of the energy storage devices 100. The fourth measuring section 24 measures voltage of each of the energy storage devices 100. The first measuring section 21 transmits, to the storage unit 3, a time signal indicating the measured charge time. The second measuring section 22 transmits, to the storage unit 3, a temperature signal indicating the measured temperature. The third measuring section 23 transmits, to the storage unit 3, a current signal indicating the measured current (current value). The fourth measuring section 24 transmits, to the storage unit 3, a voltage signal indicating the measured voltage (voltage value). The second measuring section 22 can alternatively be configured to measure temperature of some of the energy storage devices 100.

The fourth measuring section 24 transmits, to the charge adjuster 5, a voltage value signal indicating the measured voltage (voltage value) of each of the energy storage devices 100. Alternatively, the fourth measuring section 24 can be configured to measure voltage of entirety of the energy storage devices 100, or can include a portion configured to measure voltage of each of the energy storage devices 100 and a separate portion configured to measure the voltage of the entirety of the energy storage devices 100.

The storage unit 3 has a first area 31 storing drawable data (information) such as a table, and a second area 32 storing various drawable data (information) (i.e. configured to temporarily store received data). The storage unit 3 according to the present embodiment is embodied by a hard disk, a memory, or the like.

The first area 31 stores a single table 311. The table 311 can include data on charge time of the energy storage device 100, temperature of the energy storage device 100, a state of charge (SOC) of the energy storage device 100, and an upper limit voltage value corresponding to these values and based on the deposition potential, which are associated with one another. As described above, the upper limit voltage value is the upper limit value of the voltage applicable (charge voltage) to the energy storage device 100 such that the potential of the negative electrode 124 will not be lower than the deposition potential at which metal ions (lithium ions in the present embodiment) are deposited at the negative electrode 124.

The storage unit 3 can be disposed apart from the operation unit 4. In such a case, the storage unit 3 and the operation unit 4 can wiredly or wirelessly communicate with each other.

The operation unit 4 can include a central processing unit (CPU) and a memory storing a necessary operation program.

Figure 6:
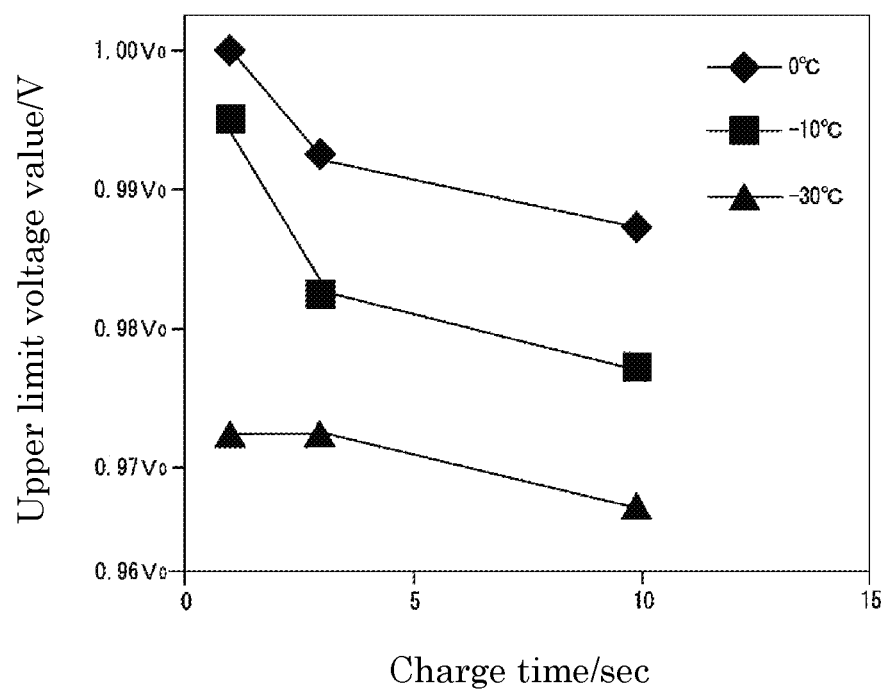
FIG. 6 is a graph exemplifying the table stored in the storage unit.

The table 311 can include data indicated in FIG. 5 or 6. FIGS. 5 and 6 each include $V_0$ denoting a predetermined upper limit voltage value. The indication "$V_0$" in FIG. 5 means that the upper limit voltage value is $1.00 \times V_0$ having a unit of volt (V). The indication "$0.98V_0$" in FIG. 5 means that the upper limit voltage value is $0.98 \times V_0$ having a unit of volt (V). As apparent from FIGS. 5 and 6, the upper limit voltage value (the upper limit value of the charge voltage inhibiting the potential of the negative electrode 124 from being lower than the deposition potential) is dependent on the charge time, the temperature of the energy storage device and the SOC. Specifically, the upper limit voltage value decreases as the charge time is longer, increases as the temperature of the energy storage device 100 rises, and decreases as the SOC is higher. The table (data) 311 is prepared with values (data) and the like obtained by a test or simulation with use of the energy storage device 100 to be charged by the battery charger 1, and is preliminarily stored in the storage unit 3 (specifically, the first area 31) of the battery charger 1.

The second area 32 stores charge time, temperature, current, and voltage transmitted from the measuring unit 2 (specifically, elapsed time data on elapsed time from charge start, temperature data on measured temperature of the energy storage device 100, current value data on current inputted to the energy storage device 100, voltage value data on voltage of the energy storage device 100, and the like). Specifically, the second area 32 stores information on temperature, current (e.g. a current value), and voltage (e.g. a voltage value) sequentially transmitted as elapse of time from the second measuring section 22, the third measuring section 23, and the fourth measuring section 24, which is associated with time (time elapsed from charge start) transmitted from the first measuring section 21. The second area 32 accordingly includes a temperature record (e.g. variation in temperature with time transition), a current record (e.g. variation in current value with time transition), and a voltage record (e.g. variation in voltage value with time transition) of the energy storage device 100. The second area 32 stores, in a drawable manner, temperature, a current value, and a voltage value (specifically, temperature data, current value data, and voltage value data) at an arbitrary time point in the current record and the temperature record.

The operation unit (charge voltage controller) 4 obtains (operates) upper limit voltage in accordance with the SOC of the energy storage device 100 based on the charge time acquired from the first measuring section 21, the temperature acquired from the second measuring section 22, the current (current value) acquired from the third measuring section 23, and the voltage (voltage value) acquired from the fourth measuring section 24. The charge adjuster 5 charges the energy storage device 100 while controlling the charge voltage (i.e. adjusting the upper limit value of the charge voltage) of the energy storage device 100 in accordance with the operation result of the operation unit 4.

The operation unit 4 obtains an SOC of the energy storage device 100 having the detected current or voltage in accordance with the current signal stored in the storage unit 3 (the current signal from the third measuring section 23) or the voltage signal stored in the storage unit 3 (the voltage signal from the fourth measuring section 24). Specifically, a correspondence relation between an SOC and voltage is preliminarily obtained in accordance with a method by integration of the current values acquired by the measuring unit 2 (specifically, the third measuring section 23) from charge start, or through a test, simulation or the like with use of the energy storage device 100 to be charged by the battery charger 1, to obtain the SOC of the energy storage device 100 in accordance with a method with reference to the voltage of the energy storage device 100 acquired by the measuring unit 2 (specifically, the fourth measuring section 24). The operation unit 4 then obtains an upper limit value of the charge voltage (an upper limit voltage value) of the energy storage device 100 from the obtained SOC, as well as the charge time and the temperature stored in the storage unit 3 (the second area 32), in accordance with the table 311 stored in the storage unit 3 (the first area 31). In other words, the operation unit 4 obtains the upper limit voltage value corresponding to the charge time, the temperature, and the SOC, with reference to the table 311 stored in the storage unit 3.

The charge adjuster 5 adjusts the charge voltage of the energy storage device 100 (voltage applied to charge the energy storage device 100) so as not to exceed the upper limit voltage (the upper limit voltage value) obtained by the operation unit 4. After adjusting the upper limit voltage, the charge adjuster 5 compares the adjusted upper limit voltage value with the voltage value of the energy storage device 100 acquired as the voltage value signal transmitted from the fourth measuring section 24, and determines whether or not to continue charge of the energy storage device 100.

Control of the upper limit voltage upon charge of the energy storage device 100 by the battery charger 1 will be described next with reference also to FIG. 7.

When the hybrid vehicle starts due to ignition on, the battery charger 1 mounted on the hybrid vehicle also starts operation. Charge of the energy storage device 100 starts when the vehicle reduces speed, for example.

When charge starts, the measuring unit 2 starts measuring charge time, temperature, current, and voltage (step S1). The operation unit 4 obtains an SOC of the energy storage device 100 from the measured current or voltage (step S2), and obtains an upper limit voltage value from the obtained SOC as well as the charge time and the temperature stored in the second area 32 of the storage unit 3, with reference to the table 311 stored in the first area 31 of the storage unit 3 (step S3). If the measured current is more than zero (No in step S4), in other words, in a charged state, the charge adjuster 5 adjusts the upper limit value of the charge voltage of the energy storage device 100 so as not to exceed the upper limit voltage (the upper limit voltage value) obtained by the operation unit 4 (step S5).

If the measured current is equal to or less than zero (Yes in step S4), in other words, in a discharging state, the charge adjuster 5 ends the flow.

Subsequently, the measuring unit 2 (specifically, the fourth measuring section 24) acquires a voltage value $V_{real}$ of the energy storage device 100 (step S6), and the charge adjuster 5 compares the acquired voltage value $V_{real}$ with the adjusted upper limit voltage value $V_0$. If the acquired voltage value $V_{real}$ is equal to or less than the adjusted upper limit voltage value $V_0$ (Yes in step S7), the charge adjuster 5 enables charge of the energy storage device 100 (step S8). The battery charger 1 then continuously charges the energy storage device 100 (i.e. return to step S1). If a charge disabling flag to be described later is set (step S9), the charge adjuster 5 resets the charge disabling flag.

If the acquired voltage value $V_{real}$ is equal to or less than the adjusted upper limit voltage value $V_0$ and the adjusted upper limit voltage value $V_0$ and the acquired voltage value $V_{real}$ have a difference not exceeding a predetermined value, the charge adjuster 5 according to the present embodiment further controls the current value or the like to inhibit the acquired voltage value $V_{real}$ from being approximate to the adjusted upper limit voltage value $V_0$.

If the acquired voltage value $V_{real}$ is more than the adjusted upper limit voltage value $V_0$ (No in step S7), the charge adjuster 5 disables charge of the energy storage device 100 and sets the charge disabling flag (step S9). When the charge disabling flag is set, the battery charger 1 stops charging the energy storage device 100. While the charge disabling flag is set, the battery charger 1 is inhibited from charging the energy storage device 100.

The above flow can be executed with feedback control, and the charge voltage is preferably controlled through the feedback control.

According to the battery charger 1 and the charging method, the energy storage device 100 is charged while the potential of the negative electrode 124 is inhibited from being lower than the deposition potential, so that the upper limit voltage can be increased (increased approximately to the upper limit value of a charge voltage range not causing the deposition) while metal ions (lithium ions in the present embodiment) are inhibited from being deposited at the negative electrode 124. This achieves suppressing degradation of the energy storage device 100 as well as securing performance of the energy storage device 100 to receive regenerative electric power.

According to the battery charger 1 and the charging method of the present embodiment, the upper limit voltage can be controlled by measuring the charge time, the temperature of the energy storage device 100, the current upon charge or discharge, and the voltage of the energy storage device 100, which are measured easily. This easily achieves suppressing degradation of the energy storage device 100 as well as securing the performance of the energy storage device 100 to receive regenerative electric power.

According to the battery charger 1 and the charging method of the present embodiment, the storage unit 3 preliminarily stores the data 311 associating charge time, temperature of the energy storage device 100, and an SOC with an upper limit voltage value corresponding thereto and based on the deposition potential. The upper limit voltage inhibiting the potential of the negative electrode 124 from being lower than the deposition potential can easily be obtained simply with reference to the data 311 if the charge time, the temperature of the energy storage device 100, and the SOC are available. This more easily achieves suppressing degradation of the energy storage device 100 as well as securing the performance of the energy storage device 100 to receive regenerative electric power.

The battery charger and the charging method for the energy storage device according to the present invention are not limited to those according to the above embodiment, but can obviously be modified in various manners within a scope not departing from the gist of the present invention. For example, a configuration according to an embodiment can additionally be provided with a configuration according to another embodiment, or a configuration according to an embodiment can partially be replaced with a configuration according to another embodiment. Furthermore, a configuration according to an embodiment can be removed partially.

The battery charger 1 and the charging method according to the above embodiment are applied to the hybrid vehicle. The present invention is, however, not limited to this case. The battery charger 1 and the charging method according to the above embodiment are applicable also to a different machine, apparatus, or the like. Still alternatively, only the battery charger is applicable.

The battery charger 1 and the charging method according to the above embodiment refer to all the charge time, the temperature of the energy storage device 100, and the SOC to obtain the upper limit voltage value. The present invention is, however, not limited to this case. The upper limit voltage value is dependent on each of the charge time, the temperature of the energy storage device 100, and the SOC. The upper limit voltage value can alternatively be obtained from at least one of the charge time, the temperature of the energy storage device 100, and the SOC. The upper limit voltage value can still alternatively be obtained also in consideration of the temporary power decrease rate of the energy storage device (see FIG. 8). When the temporary power decrease rate is large, it is preferred to perform control to decrease charge upper limit voltage. When the temporary power decrease rate is considered, upper limit voltage upon charge of the energy storage device 100 by the battery charger 1 can be controlled in accordance of the flow depicted in FIG. 9 or the like. According to the control depicted in FIG. 9, when the operation unit 4 calculates an SOC (step S2), the operation unit 4 further calculates a temporary power decrease rate of the energy storage device 100 from measured current or voltage (step S10). If the calculated temporary power decrease rate is equal to or less than 5% (Yes in step S11), the operation unit 4 obtains an upper limit voltage value with reference to the ordinary table 311 stored in the storage unit 3 (step S12). If the temporary output decrease rate calculated by the operation unit 4 is more than 5% (No in step S11), the operation unit 4 obtains an upper limit voltage value with reference to a table stored in the storage unit 3 and taking the temporary power decrease rate into consideration (i.e. a table different from the ordinary table 311) (step S13). The subsequent steps are similar to those depicted in FIG. 7.

Figure 10:
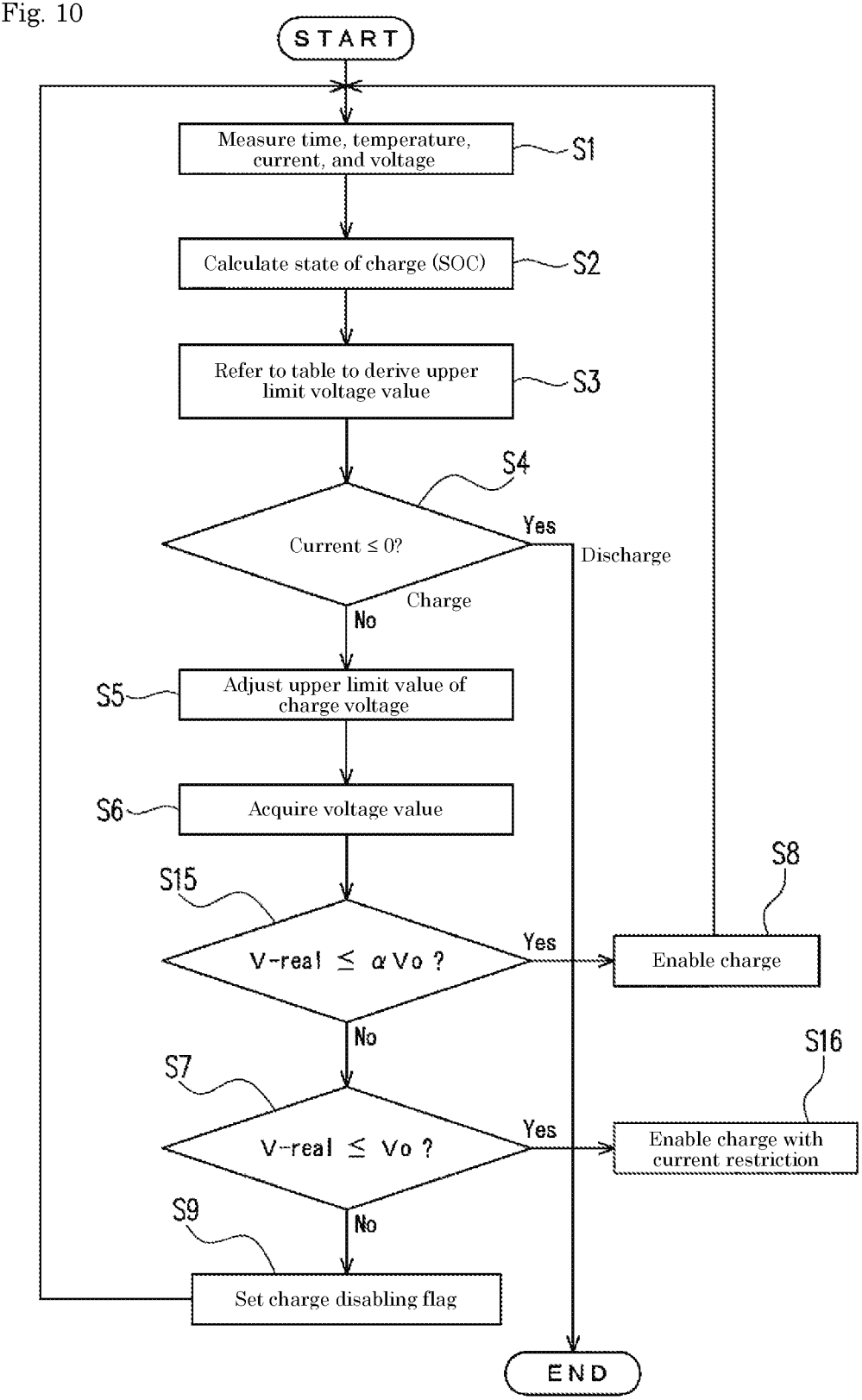
FIG. 10 is a flowchart depicting a flow of charging an energy storage device by a battery charger according to a different embodiment.
Figure 11:
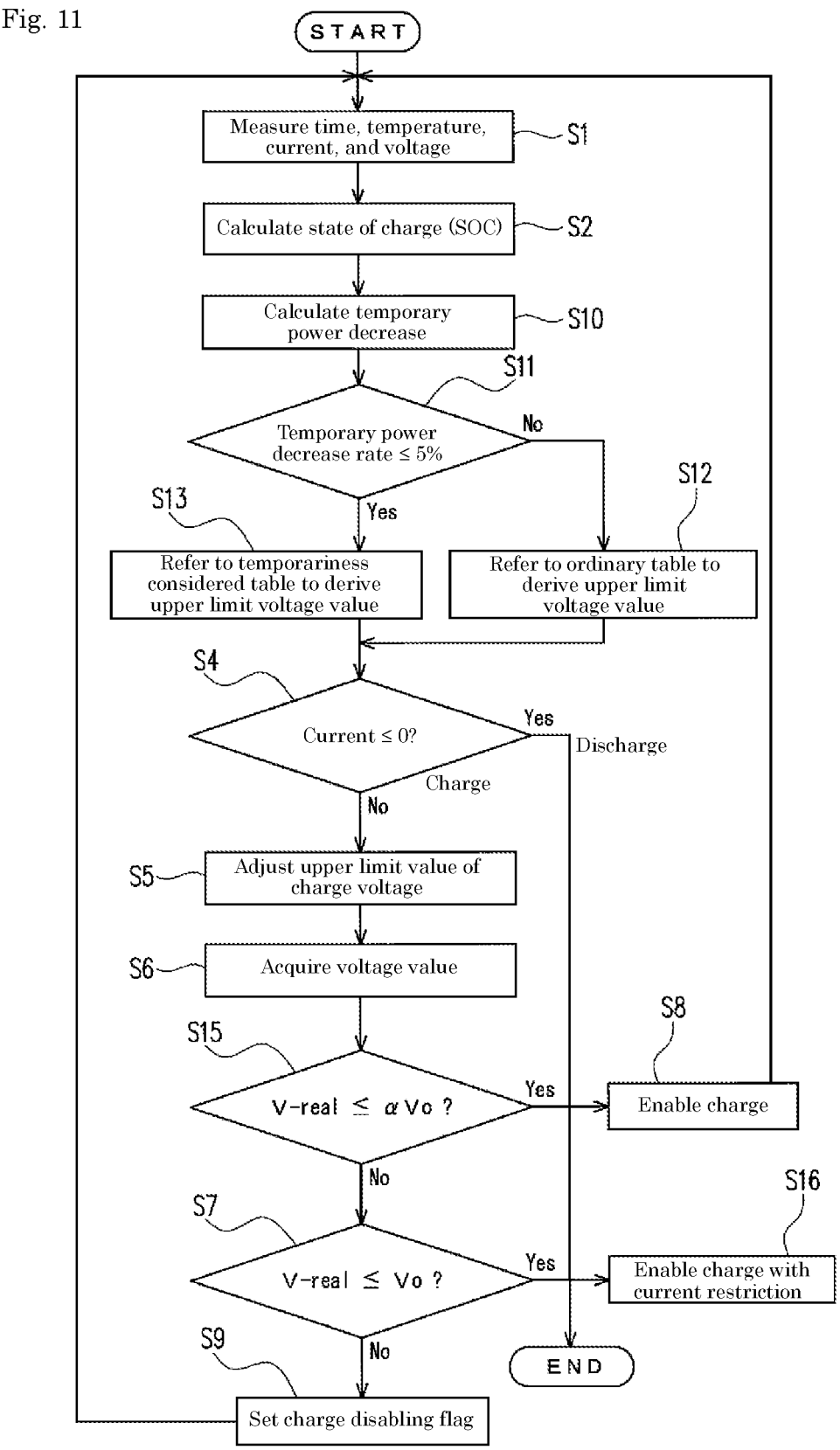
FIG. 11 is a flowchart depicting a flow of charging the energy storage device in consideration of a temporary power decrease rate by a battery charger according to a different embodiment.

The battery charger and the charging method for the energy storage device 100 can optionally include control depicted in FIG. 10 or 11. According to the control, when the acquired voltage value is approximate to the upper limit voltage $V_0$, charge is enabled with charge current being restricted. Specifically, the control is performed as follows.

Described initially is a case where the temporary power decrease rate is not considered (see FIG. 10).

Figure 7:
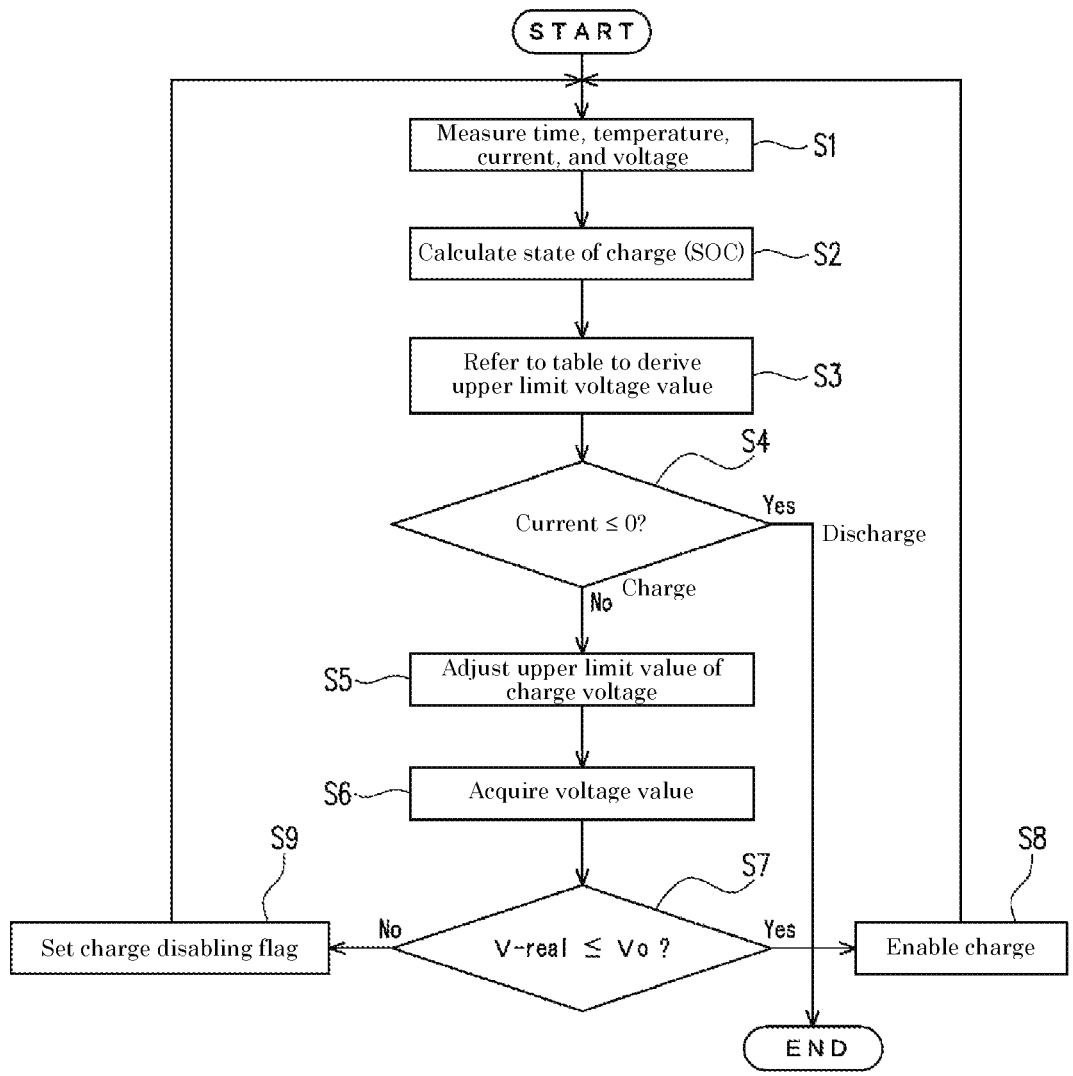
FIG. 7 is a flowchart depicting a flow of charging the energy storage device by the battery charger.

The flow up to step S6 is similar to that depicted in FIG. 7. Subsequently, when the measuring unit 2 acquires the voltage value $V_{real}$ of the energy storage device 100 (step S6), the charge adjuster 5 compares the acquired voltage value $V_{real}$ with a threshold $\alpha V_0$ obtained by multiplying the adjusted upper limit voltage value $V_0$ by a predetermined coefficient $\alpha$ (a coefficient less than one: $\alpha=0.95$ in the exemplary case in FIG. 10). If the acquired voltage value $V_{real}$ is equal to or less than the threshold $\alpha V_0$ (Yes in step S15), the charge adjuster 5 enables charge of the energy storage device 100 (step S8). The battery charger 1 then continuously charges the energy storage device 100 (i.e. return to step S1). If a charge disabling flag to be described later is set (step S9), the charge adjuster 5 resets the charge disabling flag.

If the acquired voltage value $V_{real}$ is more than the threshold $\alpha V_0$ (No in step S15), the charge adjuster 5 continuously compares the acquired voltage value $V_{real}$ with the adjusted upper limit voltage value $V_0$. If the acquired voltage value $V_{real}$ is equal to or less than the adjusted upper limit voltage value $V_0$ (Yes in step S7), the charge adjuster 5 enables charge of the energy storage device 100 but restricts the value of current (charge current) supplied to the energy storage device 100 (step S16). If the acquired voltage value $V_{real}$ is more than the adjusted upper limit voltage value $V_0$ (No in step S7), the charge adjuster 5 disables charge of the energy storage device 100 and sets the charge disabling flag (step S9).

Described next is a case where the temporary power decrease rate is considered (see FIG. 11).

Figure 9:
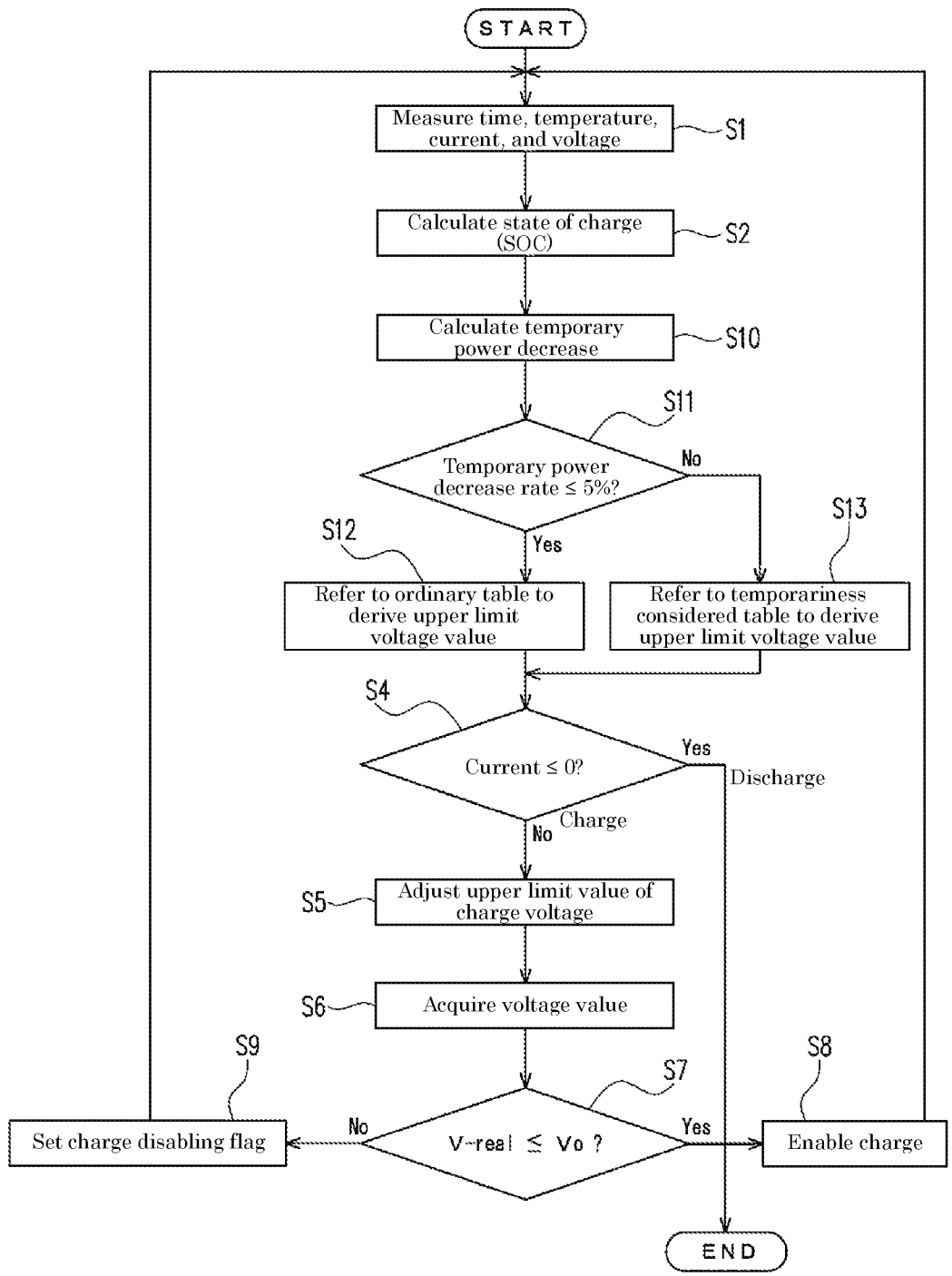
FIG. 9 is a flowchart depicting a flow of charging the energy storage device in consideration of a temporary power decrease rate by the battery charger.

The flow up to step S6 is similar to that depicted in FIG. 9. When the measuring unit 2 acquires the voltage value $V_{real}$ of the energy storage device 100 (step S6), and the charge adjuster 5 compares the acquired voltage value $V_{real}$ and the threshold $\alpha V_0$ obtained by multiplying the adjusted upper limit voltage value $V_0$ by a predetermined coefficient $\alpha$ (a coefficient less than one: $\alpha=0.95$ in the exemplary case in FIG. 11). If the acquired voltage value $V_{real}$ is equal to or less than the threshold $\alpha V_0$ (Yes in step S15), the charge adjuster 5 enables charge of the energy storage device 100 (step S8). The battery charger 1 then continuously charges the energy storage device 100 (i.e. return to step S1). If a charge disabling flag to be described later is set (step S9), the charge adjuster 5 resets the charge disabling flag.

If the acquired voltage value $V_{real}$ is more than the threshold $\alpha V_0$ (No in step S15), the charge adjuster 5 continuously compares the acquired voltage value $V_{real}$ with the adjusted upper limit voltage value $V_0$. If the acquired voltage value $V_{real}$ is equal to or less than the adjusted upper limit voltage value $V_0$ (Yes in step S7), the charge adjuster 5 enables charge of the energy storage device 100 but restricts the value of current (charge current) supplied to the energy storage device 100 (step S16). If the acquired voltage value $V_{real}$ is more than the adjusted upper limit voltage value $V_O$ (No in step S7), the charge adjuster 5 disables charge of the energy storage device 100 and sets the charge disabling flag (step S9).

Figure 12:
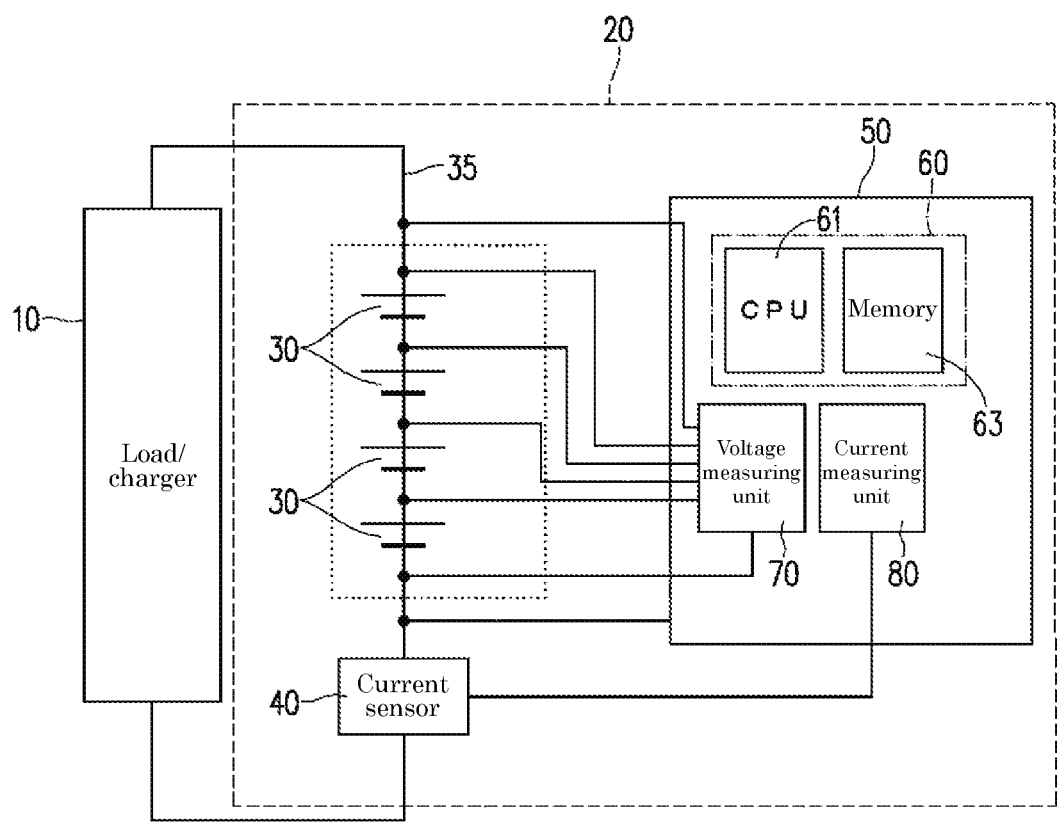
FIG. 12 is a block diagram of a battery module (energy storage apparatus) according to a different embodiment.

FIG. 12 is a block diagram of a battery module (an energy storage apparatus) according to a different embodiment. A battery module 20 can include a plurality of nonaqueous electrolyte energy storage devices 30 connected in series, a battery manager 50 configured to manage the energy storage devices 30, and a current sensor 40 configured to detect current flowing to the energy storage devices 30. The battery module is charged by a charger 10 and supplies direct current power to an inverter (a load 10) configured to drive a vehicle driving motor. The energy storage devices 30 can be lithium ion batteries including a negative active material such as a graphite-based material and a positive active material such as an iron phosphate-based material like $LiFePO_4$.

The battery manager 50 includes a controller 60, a voltage measuring unit 70, and a current measuring unit 80. The controller 60 includes a central processing unit (CPU) 61 and a memory 63. The memory 63 stores various programs for control of operation (operation depicted in FIG. 7 or 9) of the battery manager 50. The battery manager 50 can include a single or a plurality of substrates provided with various devices.

The voltage measuring unit 70 is connected to both ends of each of the energy storage devices 30 via voltage detection lines, and measures voltage V (V) of each of the energy storage devices 30 every time a predetermined period elapses. The current measuring unit 80 measures current flowing to the energy storage devices 30 with use of the current sensor 40.

The battery module 20 can be applied to drive an electric motor vehicle such as an electric vehicle (EV), a hybrid electric vehicle (HEV), or a plug-in hybrid electric vehicle (PHEV). There can be provided an alternator configured to charge for a short period of time with large current (e.g. at 5 CA to 10 CA for 10 to 30 seconds).

The battery module 20 can be configured as a battery pack including the energy storage device 30, the current sensor 40, and the battery manager 50 accommodated in a single container. The battery pack can be a 12V power source mounted on a movable body such as a vehicle, a train, a vessel, or an airplane and used for engine start. The battery pack mounted on the vehicle is preferred to assist driving the vehicle or supply power to an auxiliary machine.

The battery module 20 or the battery pack can be a 48V power source configured to assist driving the vehicle or supply power to an auxiliary machine.

Described below is specific exemplary use of the battery module 20 or the battery pack assisting driving the vehicle and supplying power to an auxiliary machine.

Exemplary use of the battery module 20 or the battery pack for assistance of driving the vehicle includes EV travel, EV travel at low speed (upon parking or in a traffic jam), engine start, engine restart from a stopped state during idle, regeneration upon decrease in speed, electric boost (motor assist), and electric turbocharge.

Exemplary use of the battery module 20 or the battery pack for power supply to an auxiliary machine includes power supply to an air conditioner, power supply to an electric stabilizer, power supply to a defogger, and power supply to a drive assist system or for automatic drive.

FIG. 12 exemplifies a case where the controller 60 is accommodated in a container accommodating the energy storage devices 30. The present invention is, however, not limited to this case. The controller can alternatively be disposed apart from the energy storage devices. For example, the controller mounted on the vehicle can function as a charge voltage controller.

Figure 13:
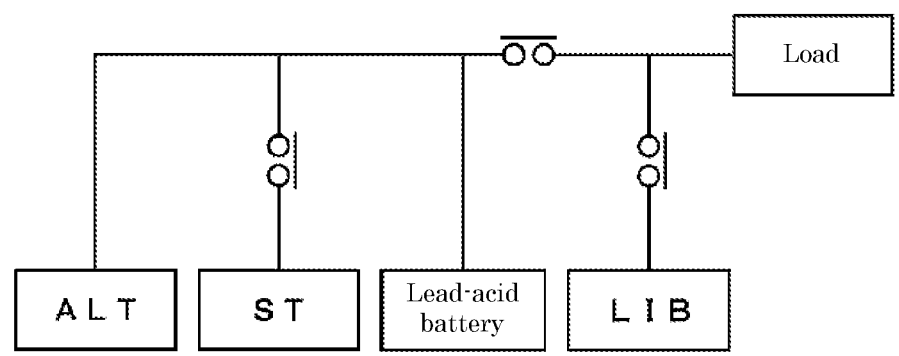
FIG. 13 is an explanatory view on a method for controlling input and output of an energy storage device according to a different embodiment.

FIG. 13 exemplifies a vehicle provided with an alternator ALT, a starter motor ST, a lead-acid battery (an auxiliary energy storage device or an auxiliary energy storage apparatus) functioning as a 12V power source, and a lithium ion battery LIB (an energy storage device or an energy storage apparatus) functioning as a 12V power source or a 48V power source. In a case where the lead-acid battery is in a low state of charge, the lead-acid battery can be charged in preference to the lithium ion battery LIB. The auxiliary energy storage device (or the auxiliary energy storage apparatus) is not limited to the lead-acid battery but can alternatively be a battery of a different type or a capacitor. The auxiliary energy storage device is preferred to be an energy storage device other than the lithium ion battery in order for redundancy.

The invention claimed is:

1. A charge voltage controller for a chargeable and dischargeable energy storage device including an electrode assembly having a positive electrode and a negative electrode,
    wherein the charge voltage controller is configured to control upper limit voltage applied to charge the energy storage device in accordance with at least one of charge time of the energy storage device, current inputted to the energy storage device, temperature of the energy storage device, and a state of charge of the energy storage device, to inhibit potential of the negative electrode from being lower than deposition potential at which metal ions transmitting and receiving an electric charge between the positive electrode and the negative electrode are deposited at the negative electrode, and
    wherein the charge voltage controller is configured to control the upper limit voltage further in accordance with a temporary power decrease of the energy storage device, the temporary power decrease being recoverable power decrease, and
    wherein the charge voltage controller is configured to decrease the upper limit voltage when the temporary power decrease is large.

2. An energy storage apparatus comprising:
    an energy storage device; and
    the charge voltage controller for the energy storage device according to claim 1.

3. The energy storage apparatus according to claim 2, further comprising:
    a storage unit configured to store data associating at least one of the charge time, the temperature, and the state of charge, with an upper limit voltage value corresponding thereto and based on the deposition potential; wherein
    the charge voltage controller for the energy storage device controls the upper limit voltage in accordance with the data stored in the storage unit.

4. A battery charger for a chargeable and dischargeable energy storage device including an electrode assembly having a positive electrode and a negative electrode, the battery charger comprising:
    a charge unit configured to charge the energy storage device; and
    the charge voltage controller for the energy storage device according to claim 1; wherein
    the charge voltage controller for the energy storage device controls upper limit voltage applied to charge the energy storage device by controlling the charge unit.

5. The battery charger for the energy storage device according to claim 4, the battery charger comprising at least one of a first measuring section configured to measure charge time of the energy storage device, a second measuring section configured to measure temperature of the energy storage device, a third measuring section configured to measure current inputted to the energy storage device, and a fourth measuring section configured to measure voltage of the energy storage device, wherein
the charge voltage controller for the energy storage device controls the charge unit to control the upper limit voltage in accordance with at least one of the charge time, the temperature, and the state of charge of the energy storage device based on the current or the voltage.

6. The battery charger for the energy storage device according to claim 5, the battery charger comprising:
a storage unit configured to store data associating at least one of the charge time, the temperature, and the state of charge, with an upper limit voltage value corresponding thereto and based on the deposition potential; wherein
the charge voltage controller for the energy storage device controls the charge unit to adjust the upper limit voltage so as to have an upper limit voltage value included in the data of the storage unit and corresponding to a value measured by at least one of the first to fourth measuring sections.

7. The battery charger for the energy storage device according to claim 6, wherein, in the data, the upper limit voltage value decreases when the charge time extends, increases when the temperature rises, and decreases when the state of charge is higher.

8. A method for charging a chargeable and dischargeable energy storage device including an electrode assembly having a positive electrode and a negative electrode, the method comprising:
charging the energy storage device while controlling upper limit voltage to inhibit potential of the negative electrode from being lower than deposition potential at which metal ions transmitting and receiving an electric charge between the positive electrode and the negative electrode are deposited at the negative electrode, and in accordance with a temporary power decrease of the energy storage device, the temporary power decrease being recoverable power decrease,
wherein the controlling of the upper limit voltage comprises decreasing the upper limit voltage when the temporary power decrease is large.

9. The method for charging the energy storage device according to claim 8, the method further comprising charging an auxiliary energy storage device in a low state of charge in preference to the energy storage device.

10. A charge voltage controller for controlling charging of an energy storage device, comprising:
a processor; and
a memory storing instructions which are executed by the processor to control an upper limit voltage applied to charge the energy storage device in accordance with a temporary power decrease of the energy storage device, the temporary power decrease being recoverable power decrease,
wherein the charge voltage controller is configured to decrease the upper limit voltage when the temporary power decrease is large.

11. The charge voltage controller of claim 10, wherein the charge voltage controller is included in a battery charger mounted on a vehicle.

12. The charge voltage controller of claim 10, wherein the charge voltage controller controls the upper limit voltage applied to charge the energy storage device based on measured values of:
charge time of the energy storage device;
temperature of the energy storage device;
a current value inputted to the energy storage device; and
a voltage value of the energy storage device.

13. The charge voltage controller of claim 12, wherein the charge voltage controller calculates a temporary power decrease of the energy storage device from the measured current value or the measured voltage value.

14. The charge voltage controller of claim 13, wherein:
if the calculated temporary power decrease is equal to or less than a predetermined value, then the charge voltage controller obtains an upper limit voltage value with reference to a first table, and
if the calculated temporary output decrease is more than the predetermined value, then the charge voltage controller obtains an upper limit voltage value with reference to a second table which takes the temporary power decrease into consideration.

15. The charge voltage controller of claim 12, wherein the charge voltage controller controls the upper limit voltage applied to charge the energy storage device, by controlling a charge adjuster which adjusts a charge current of the energy storage device.

16. The charge voltage controller of claim 15, wherein the energy storage device comprises a positive electrode and a negative electrode, and the charge adjuster controls the upper limit voltage applied to charge the energy storage device, to inhibit potential of the negative electrode from being lower than a deposition potential at which metal ions transmitting and receiving an electric charge between the positive electrode and the negative electrode are deposited at the negative electrode.

17. The charge voltage controller of claim 15, wherein the charge adjuster adjusts the voltage applied to charge the energy storage device so as not to exceed the upper limit voltage.

18. The charge voltage controller of claim 17, wherein after adjusting the upper limit voltage, the charge adjuster compares a value of the adjusted upper limit voltage with the voltage value of the energy storage device, and determines whether to continue charge of the energy storage device.

* * * * *